March 18, 1947.  C. A. DE GIERS  2,417,546
AIR GUN VALVE MECHANISM
Filed Aug. 31, 1943
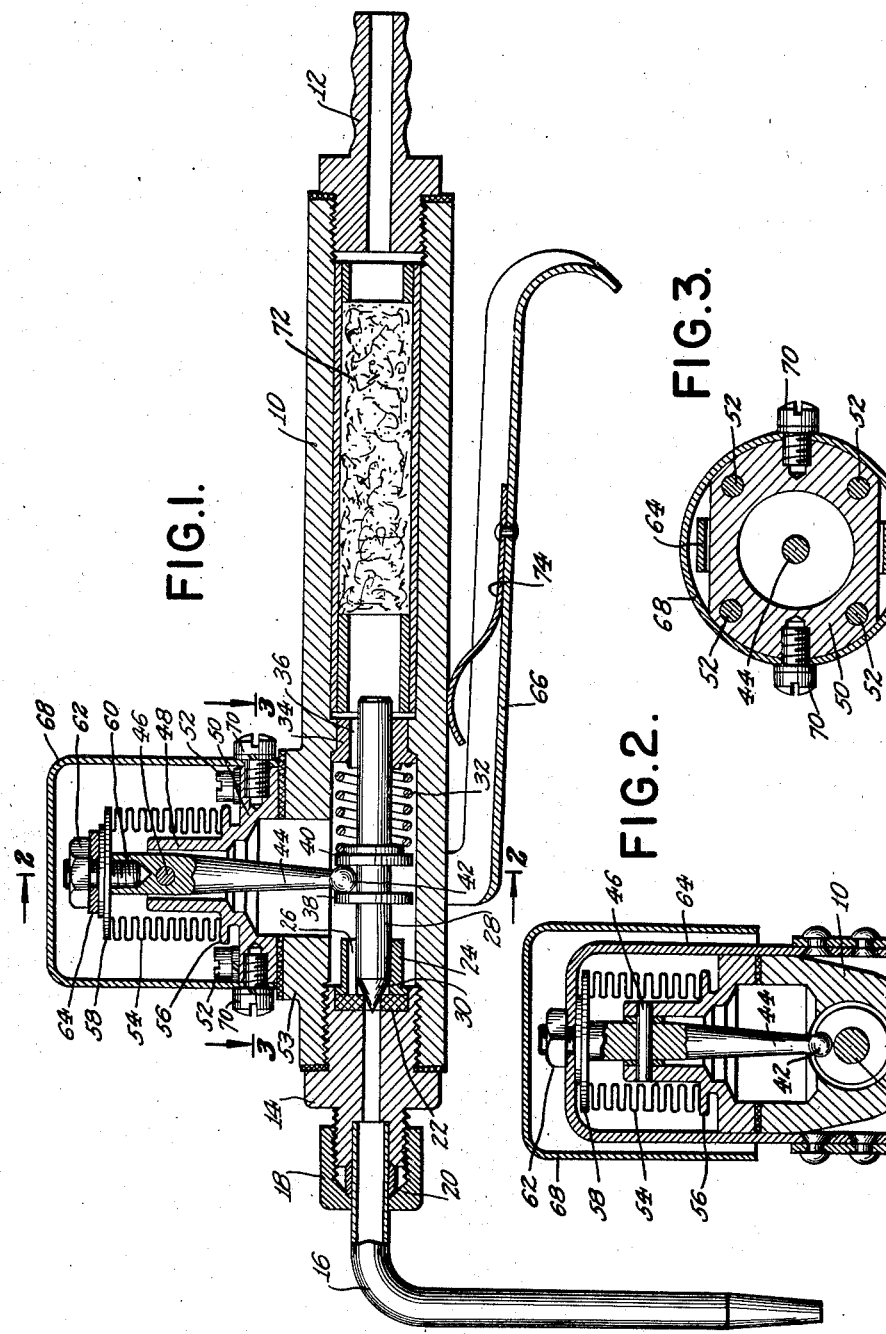
INVENTOR.
Clarence A. de Giers
BY
John C. Kerr
ATTORNEY Patented Mar. 18, 1947

2,417,546

UNITED STATES PATENT OFFICE 2,417,546

AIR GUN VALVE MECHANISM

Clarence A. de Giers, Forest Hills, N. Y., assignor to The Liquidometer Corporation, Long Island City, N. Y., a corporation of Delaware Application August 31, 1943, Serial No. 500,655

1 Claim. (Cl. 251—134)

This invention pertains to air guns, and an object of the invention is to provide a gun having positive jet control throughout its entire range of operations, and which avoids all waste of air.

Although the device is usually called an "air" gun it is in practice often used with other gases, and the invention is intended to cover all uses regardless of the kind of gas.

In my experience with available types of guns in such operations as blowing dust from delicate parts during manufacturing operations, it was impossible, without excessive care, to control the flow of gas with sufficient accuracy. One reason for this difficulty was the fact that in the operation of the gun, parts were required to move through packing glands in which considerable friction was encountered between shaft and packing. If the packing were tight enough to prevent escape of gas the force required to move the valve was so great as to prevent delicate manual control. On the other hand, if the packing were loose enough to permit the required freedom of movement, then the loss of gas through the gland was excessive, in fact prohibitive, when, as is usually the case, an expensive gas such as nitrogen was used.

As will appear, the present invention overcomes the above shortcomings by providing a device free from gas leakage and practically frictionless and thereby permitting the operator to provide, at will, anything from a breath to a blast of air at the nozzle.

Further and other objects and advantages will be apparent from the specification and claim, and from the accompanying drawing which illustrates what is now considered the preferred embodiment of the invention.

Fig. 1 is a longitudinal section through the device;

Fig. 2 is a cross-section on line 2—2 of Fig. 1;

Fig. 3 is a cross-section on line 3—3 of Fig. 1.

The device has a body 10 with a hose connection 12 at one end, and at the other end a detachable fitting 14 adapted to support a nozzle 16 secured in place by a nut 18 and packing 20.

22 is a valve seat usually of fiber or plastic, and 24 is a bushing having gas passages between longitudinal splines 26 which serve to guide the longitudinal movements of valve stem 28. Stem 28 has a conical valve 30 normally closing the circular opening in the center of valve seat 22. Spring 32 constantly urges stem 28 and valve 30 towards valve closing position. The other end of stem 28 is guided by a bushing 34 having splines 36 similar to splines 26 in bushing 24.

Stem 28 has spaced-apart rings 38, 40, between which is a ball-end 42 of a vertical lever 44, fulcrumed on a pin 46 in the upper end of a sleeve 48 which has a flanged lower end 50 attached by screws 52 to the flat upper surface of a boss 53 on the top of body 10.

Surrounding sleeve 48 is a bellows 54 having its lower end sealed to a flange 56 projecting from sleeve 48. The upper end of the bellows has a head 58 secured by bolt 60 and nut 62 to the upper end of lever 44. The interior of the bellows, together with the compartment containing valve stem 28 and including the passage interconnecting the compartment and the bellows, form a sealed chamber.

Clamped between nut 62 and bellows head 58 is the upper horizontal portion of an inverted U-shaped yoke 64 (Fig. 2) the lower ends of the arms of which are attached to a lever 66 extending to the right, under body 10 (Fig. 1), and serving as a control lever in the fingers of the operator when his hand surrounds the body portion 10.

A cup-shaped cover 68 attached by screws 70 to flange 50 serves to protect bellows 54 from contact with surrounding objects.

Gas is supplied to the instrument by a hose connected to fitting 12 and passes through filter cartridge 72 into the valve chamber past splines 36.

In operation, when the operator moves lever 66 against the resistance of spring 74, yoke 64 distorts bellows 54 and rocks lever 44 about its fulcrum 46 causing ball 42 to move valve stem 28 to the right as seen in Fig. 1 against spring 32, thus moving valve 30 from its seat 22 and allowing gas in the quantity desired by the operator to pass through nozzle 16.

It is to be understood that the invention is not limited to the specific embodiment herein illustrated and described, but may be used in other ways without departure from its spirit as defined by the following claim:

I claim:

A manually operable valve mechanism adapted for sensitive and accurate control of gaseous flow through a nozzle, comprising a tubular body member, means for conducting a gas to and from said body member, a valve seat in said body member, a longitudinally movable valve having a tapered portion for association with said seat, means for guiding said valve during its movement constructed as a plurality of ribs between which a gas may flow past said valve, an actuating lever for said valve connected thereto so as to move said valve positively in both directions, means pivoting said lever intermediate its ends about a center fixed in respect to said body member, a flexible metallic bellows having one end fixed in gas-tight relation in said body member and the other end secured to and in gas-tight relation with an outer portion of said lever, said metallic bellows being adapted to be flexed by the rocking of said lever about its pivotal point in the operation of said valve, an actuating finger lever having a bifurcated portion extending around said body member and rigidly secured at its outer end to the outer end of the first named lever, said finger lever having a major actuating portion on the opposite side of said body member from which the first named lever extends and extending along substantially parallel with said body member for a substantial distance, and a helical compression spring interposed between a part rigid with said body member and a part rigid with said valve and tending to urge the latter towards its closed position, said levers and valve being so constructed and arranged that said valve may be positively actuated in both directions by the operation of said finger lever.

CLARENCE A. DE GIERS.

REFERENCES CITED

The following references are of record in the file of this patent:

UNITED STATES PATENTS

| Number | Name | Date |
|---|---|---|
| 2,143,296 | Beeman | Jan. 10, 1939 |
| 1,415,467 | Pickop | May 9, 1922 |
| 2,271,151 | Fina | Jan. 27, 1942 |
| 1,301,948 | Kaplan | Apr. 29, 1919 |
| 1,167,895 | Fulton | Jan. 11, 1916 |
| 2,110,326 | De Lancey | Mar. 8, 1938 |
| 785,387 | Tuck | Mar. 21, 1905 |

FOREIGN PATENTS

| Number | Country | Date |
|---|---|---|
| 513,013 | British | Oct. 2, 1939 |
| 29,854 | Swiss | 1903 |